(12) United States Patent
Koreeda et al.

(10) Patent No.: US 8,767,064 B2
(45) Date of Patent: Jul. 1, 2014

(54) COMBINATION OF OPTICAL CONNECTOR INSPECTION APPARATUS AND OPTICAL CONNECTOR CAPABLE OF INSPECTING A HELD POSTURE OF AN OPTICAL FIBER

(75) Inventors: Yuichi Koreeda, Tokyo (JP); Hiroyuki Honma, Tokyo (JP); Kazuhito Asada, Tokyo (JP); Tomohiko Aso, Tokyo (JP); Hisaya Takahashi, Tokyo (JP); Mikio Oda, Tokyo (JP); Hideyuki Ono, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 397 days.

(21) Appl. No.: 12/799,487

(22) Filed: Apr. 26, 2010

(65) Prior Publication Data

US 2010/0295936 A1    Nov. 25, 2010

(30) Foreign Application Priority Data

May 25, 2009   (JP) ................. 2009-125237

(51) Int. Cl.
*H04N 7/18* (2006.01)
(52) U.S. Cl.
USPC ............... 348/95; 348/E7.085; 356/73.1
(58) Field of Classification Search
USPC ........ 348/83, 87, 359, 804, 901.1, 86, 92, 95, 348/98, 197; 385/60, 87; 382/141; 356/73.1
See application file for complete search history.

(56) References Cited

U.S. PATENT DOCUMENTS 5,953,113 A * 9/1999 Poffenbarger ............... 356/73.1

FOREIGN PATENT DOCUMENTS

| JP | 8-278119 | | 10/1996 |
| JP | 2003-130624 | | 5/2003 |
| JP | 2003130624 A | * | 5/2003 |
| JP | 3778090 | | 7/2003 |
| JP | 3778090 B2 | * | 5/2006 |

OTHER PUBLICATIONS

Machine Translation of JP 2003130624 A.*
Machine Translation of JP 3778090 B2.*
Canadian Office Action dated Jun. 21, 2012 in Canadian Patent Application No. 2,702,661.

* cited by examiner

*Primary Examiner* — Christopher S Kelley
*Assistant Examiner* — Ana Picon-Feliciano
(74) *Attorney, Agent, or Firm* — Collard & Roe, P.C.

(57) ABSTRACT

The light source is disposed in a direction traversing the axial direction A of the optical connector. The optical connector holder comprises an inspection light reflecting portion. The inspection light reflecting portion deflects and reflects the inspection light from the light source to the axial direction A so that the inspection light enters the reference hole portion of the optical connector.

4 Claims, 7 Drawing Sheets

COMBINATION OF OPTICAL CONNECTOR INSPECTION APPARATUS AND OPTICAL CONNECTOR CAPABLE OF INSPECTING A HELD POSTURE OF AN OPTICAL FIBER

This application is based upon and claims the benefit of priority from Japanese Patent Application No. 2009-125237, filed on May 25, 2009, the disclosure of which is incorporated herein in its entirety by reference.

BACKGROUND ART

This invention relates to an optical connector inspection apparatus for use in inspecting, in a process of assembly of an optical connector designed to hold and fix an optical fiber in a correct posture, a held posture of the optical fiber in the optical connector, i.e. whether or not the optical connector holds the optical fiber in the correct posture.

A technique relating to this type of optical connector inspection apparatus is disclosed in, for example, JP-B-3778090 (Patent Document 1). An optical connector inspection apparatus disclosed in Patent Document 1 inspects the eccentricity of a plurality of optical fiber holes formed in an optical connector to hold optical fibers therein. In the optical connector, a pair of guide holes are formed in parallel to an extending direction of the optical fiber holes. This optical connector inspection apparatus inspects the eccentricity of the optical fiber holes with respect to the optical connector by holding the optical connector, irradiating inspection light, emitted from a light source disposed rearward of the optical connector, to a rear end of the optical connector, and then performing image processing of transmitted light beams coming from a front end of the optical connector through the guide holes and the optical fiber holes.

The optical connector inspection apparatus disclosed in Patent Document 1 is an apparatus not intended to inspect the held posture of the optical fibers in the optical connector but intended to inspect the eccentricity of the optical fiber holes before holding the optical fibers and thus is used to carry out the inspection before the optical fibers are attached to the optical connector. Therefore, if an attempt is made to carry out the inspection in a state where the optical fibers are attached to the optical connector, the inspection light emitted from the light source disposed rearward of the optical connector is shielded by the optical fibers. Taking this into account, in order to prevent the inspection light from being shielded by the optical fibers, a technique is considered that performs the inspection while maintaining a state where the optical fibers are forcibly put out of the proceeding path of the inspection light. However, such a technique requires quite complicated operations.

Further, in the optical connector inspection apparatus disclosed in Patent Document 1, since the inspection light is irradiated to the rear end of the optical connector held by the apparatus, the light source is disposed rearward of the optical connector. Therefore, this optical connector inspection apparatus as a whole, including the light source, is very large in size.

SUMMARY OF THE INVENTION

It is therefore an object of this invention to provide an optical connector inspection apparatus that is small in size and is capable of inspecting a held posture of an optical fiber even in a state where the optical fiber is attached to an optical connector.

It is another object of this invention to provide an optical connector inspection apparatus that is capable of inspecting a held posture of an optical fiber even in a state where the optical fiber is attached to an optical connector, and thus contributes to easily holding and fixing the optical fiber.

According to an aspect of this invention, there is provided an optical connector inspection apparatus inspecting an optical connector having an optical fiber holding portion penetrating in an axial direction and holding an optical fiber, and a reference hole portion penetrating in the axial direction, said apparatus comprising an optical connector holder adapted to hold the optical connector, a light source adapted to emit inspection light, and an image pickup device disposed forward of the optical connector in the axial direction and adapted to pick up an image of a transmitted light beam obtained such that the inspection light irradiated to a rear end, in the axial direction, of the optical connector held by said optical connector holder is transmitted through said reference hole portion, and an image of an end face of the optical fiber held by said optical fiber holding portion. The optical connector inspection apparatus inspects a held posture of the optical fiber in the optical connector based on an image pickup result by said image pickup device. The light source is disposed in a direction traversing the axial direction of the optical connector. The optical connector holder comprises an inspection light reflecting portion deflecting and reflecting the inspection light from said light source to the axial direction of the optical connector so that the inspection light enters said reference hole portion of the optical connector.

According to another aspect of this invention, there is provided an optical connector inspection method of inspecting an optical connector having an optical fiber holding portion penetrating in an axial direction and holding an optical fiber, and a reference hole portion penetrating in the axial direction, said method comprising the steps of holding the optical connector, emitting inspection light, irradiating the inspection light to a rear end, in the axial direction, of the optical connector held, and picking up an image of a transmitted light beam obtained such that the inspection light irradiated to the rear end, in the axial direction, of the optical connector is transmitted through said reference hole portion, and an image of an end face of the optical fiber held by said optical fiber holding portion. The method inspects a held posture of the optical fiber in the optical connector based on an image pickup result of the transmitted light beam and the end face of the optical fiber held by said optical fiber holding portion. The inspection light emitting step emits the inspection light in a direction traversing the axial direction of the optical connector. The inspection light irradiating step deflects and reflects the inspection light in the axial direction of the optical connector before irradiating the inspection light to the rear end, in the axial direction, of the optical connector so that the inspection light enters said reference hole portion of the optical connector.

DESCRIPTION OF THE EXEMPLARY EMBODIMENTS

Hereinbelow, referring to the drawings, a description will be given of optical connector inspection apparatuses and optical connector inspection methods using those optical connector inspection apparatuses, respectively, according to first and second embodiments of this invention.

First, an optical connector 100 as an inspection object will be described.

Referring to FIGS. 1A and 1B and FIGS. 2A and 2B, the optical connector 100 comprises a housing 101, a clamp member 103, and an optical fiber cord 102 held by the housing 101.

The optical fiber cord 102 comprises a plurality of optical fibers 102a arranged in parallel. In FIGS. 1A and 1B and FIGS. 2A and 2B, the optical fiber cord 102 is only pre-attached to the housing 101 and not yet fixed thereto.

The housing 101 has a fitting hole portion 101a formed at its front end in its axial direction (insertion/removal direction with respect to a non-illustrated mating optical connector) A for fitting over the mating optical connector, an optical fiber holding portion 101b holding the optical fibers 102a of the optical fiber cord 102 where its coating is stripped, and four reference hole portions 101c formed at corners of the inside of the fitting hole portion 101a. Each reference hole portion 101c penetrates the housing 101 in the axial direction A. In this invention, one end, where the fitting hole portion opens, of the housing is defined as a front end of the optical connector (housing), while the other end, opposite to the front end, of the housing is defined as a rear end of the optical connector (housing).

First Embodiment

The optical connector inspection apparatus according to the first embodiment of this invention will be described.

Figure 1A:
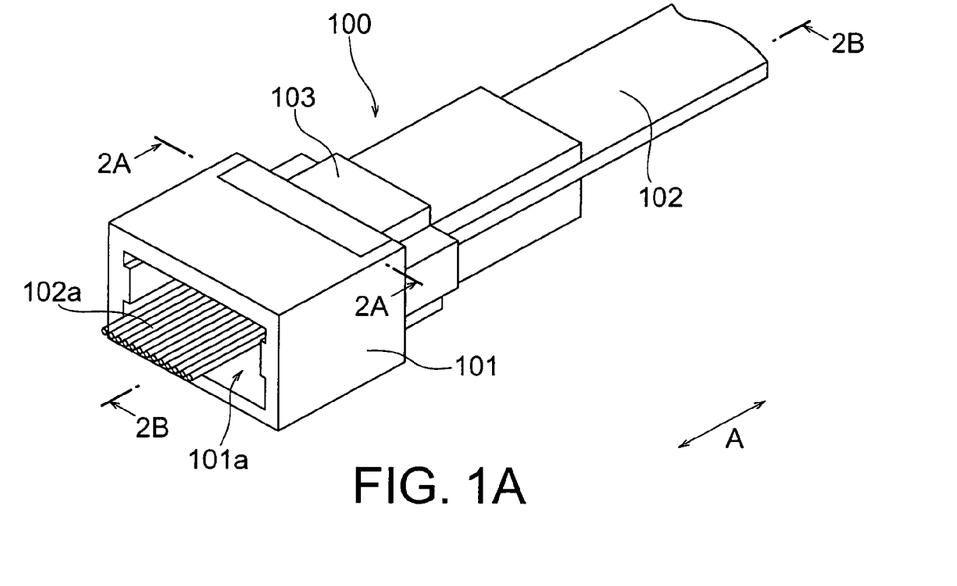
FIGS. 1A and 1B are front and rear perspective views, respectively, of an optical connector being an inspection object of each of optical connector inspection apparatuses according to first and second embodiments of this invention.
Figure 1B:
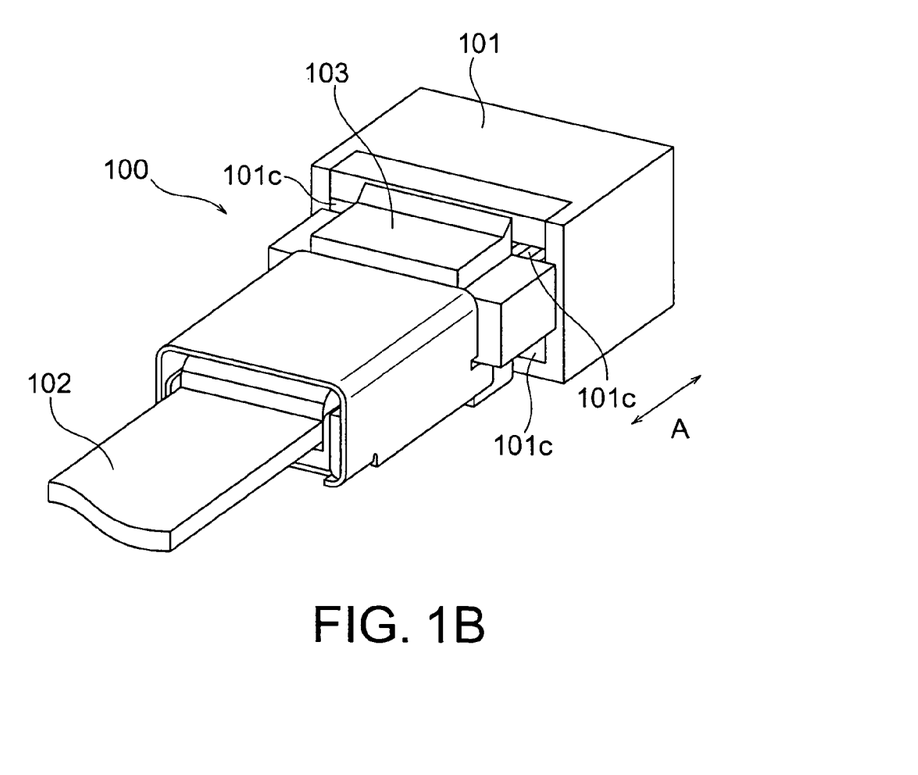
Figure 2A:
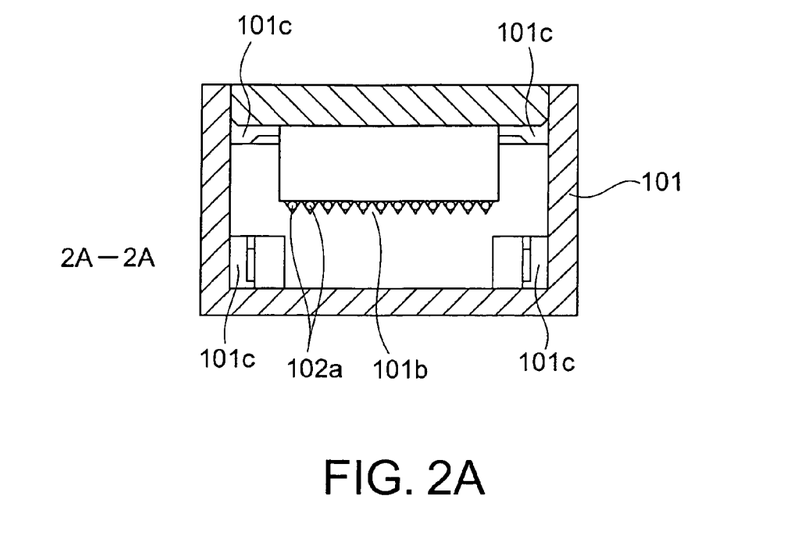
FIGS. 2A and 2B are sectional views, taken along section line 2A-2A and section line 2B-2B, respectively, of the optical connector shown in FIG. 1A.
Figure 2B:
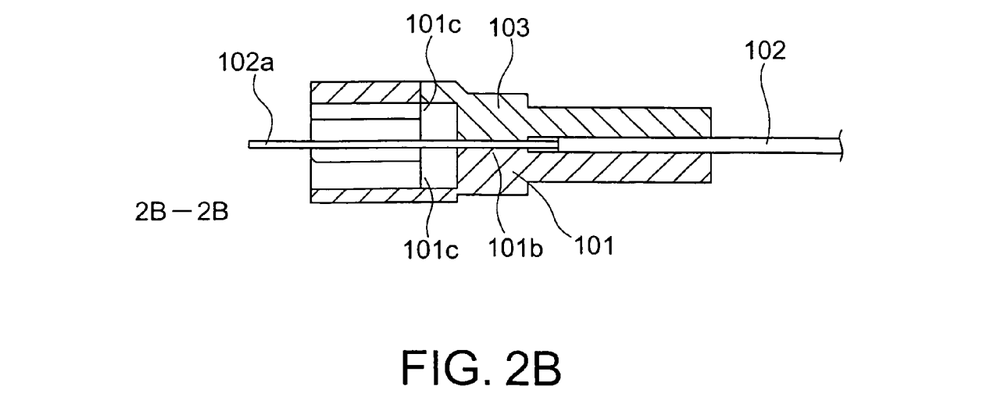
Figure 3:
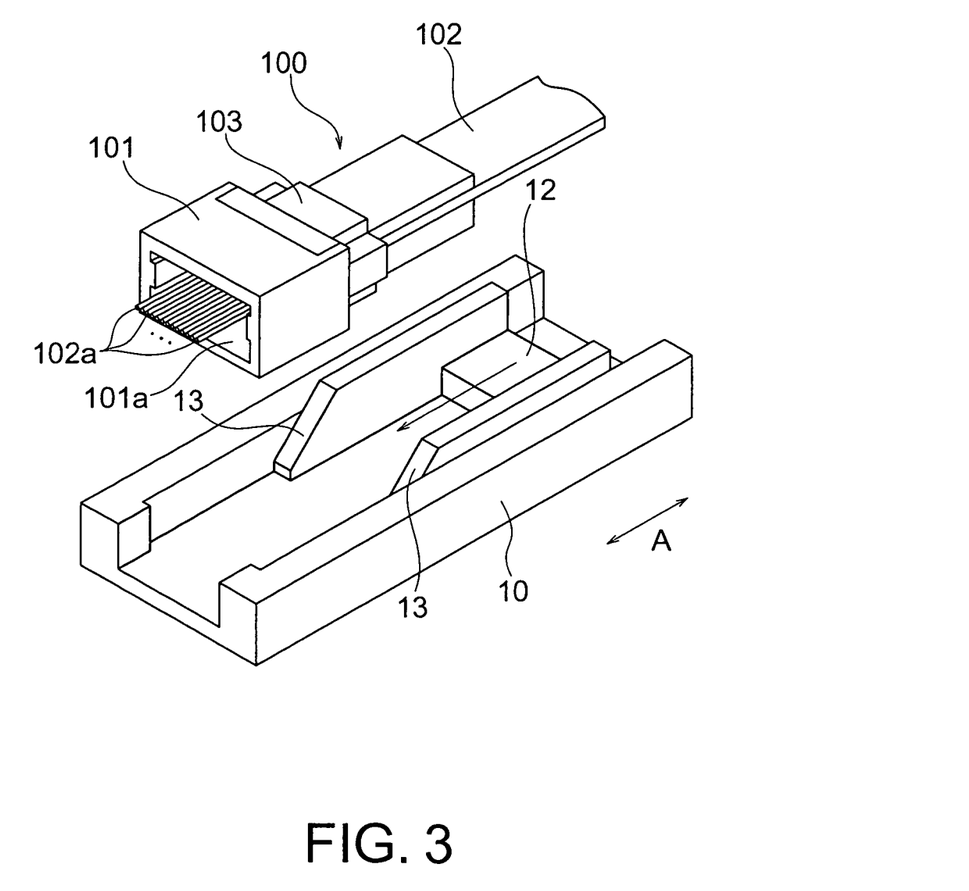
FIG. 3 is a perspective view showing the main part of the optical connector inspection apparatus before holding the optical connector according to the first embodiment of this invention.
Figure 4:
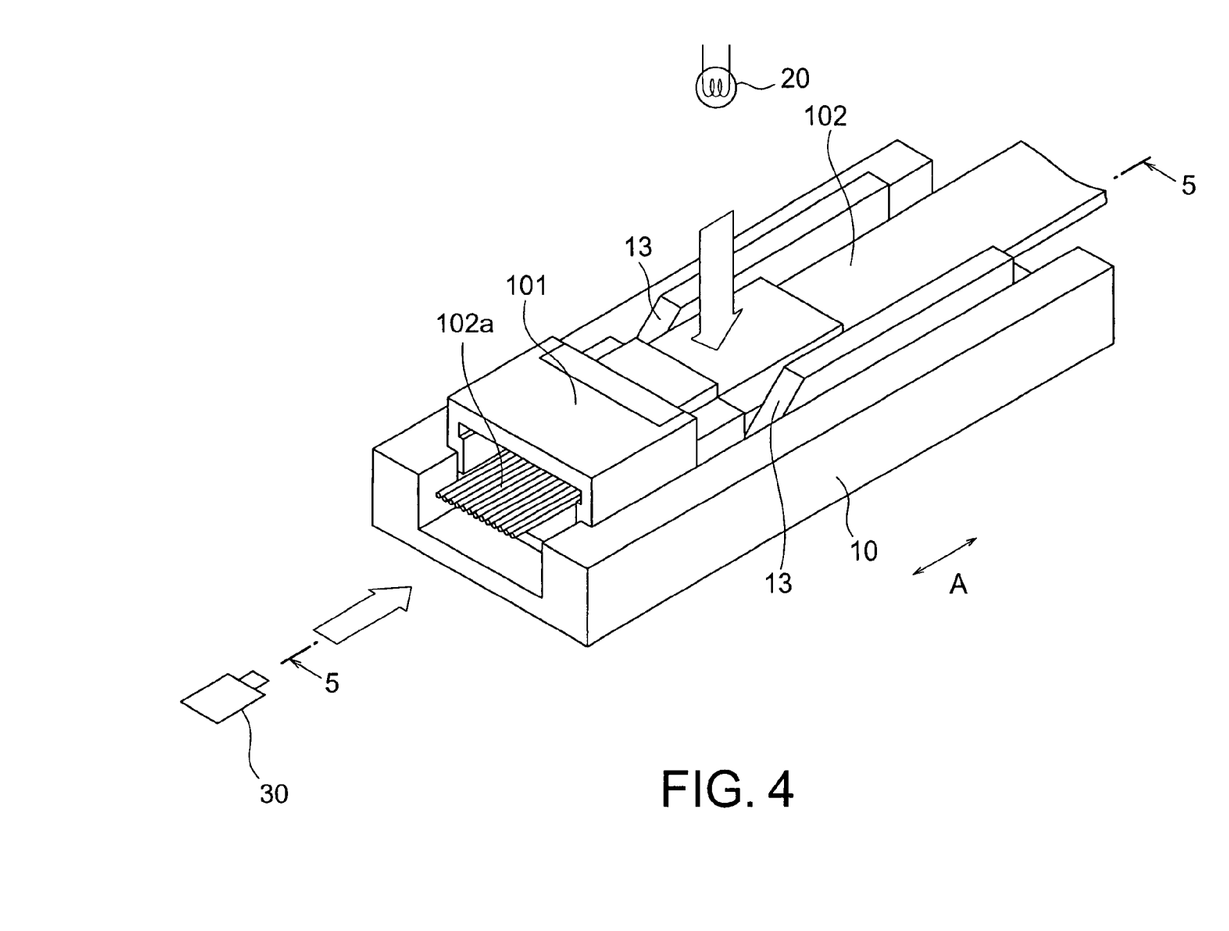
FIG. 4 is a perspective view showing the optical connector inspection apparatus holding the optical connector according to the first embodiment of this invention.
Figure 5:
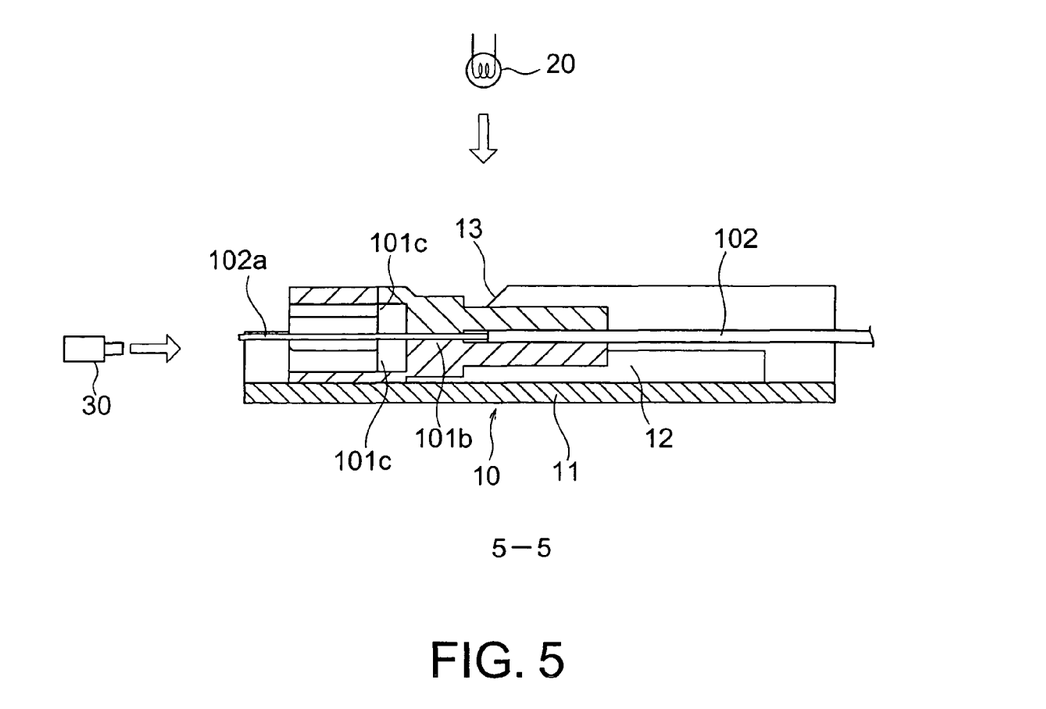
FIG. 5 is a sectional view, taken along section line 5-5, of the optical connector inspection apparatus shown in FIG. 4.

Referring to FIGS. 3 to 5, this optical connector inspection apparatus inspects a held posture of the optical fiber cord 102 (i.e. the optical fibers 102a of the optical fiber cord 102) in the optical connector 100 and comprises an optical connector holder 10, a light source 20, and an image pickup device 30.

The optical connector holder 10 holds the optical connector 100 and has a support base 11 and a pressure member 12. The optical connector 100 is placed on the support base 11. Cooperatively with the support base 11, the pressure member 12 holds the optical connector 100 under pressure with the use of non-illustrated biasing means such as a coil spring. For example, the optical connector holder 10 is made of metal. The optical connector holder 10 may be made of resin with high dimensional accuracy.

The light source 20 emits inspection light and formed by, for example, a halogen lamp, a xenon lamp, or a plurality of LEDs.

The image pickup device 30 is disposed forward of the optical connector 100 and adapted to pick up images of transmitted light beams obtained such that the inspection light irradiated to the rear end of the optical connector 100 held by the optical connector holder 10 is transmitted through the four reference hole portions 101c, and an image of an end face of the optical fiber cord 102 held by the optical fiber holding portion 101b. The image pickup device 30 is formed by, for example, a CCD camera. The image pickup device 30 is connected to, for example, a non-illustrated personal computer having calculation means and storage means, wherein the calculation means performs a calculation based on dedicated software stored in the storage means.

Then, based on the image pickup result by the image pickup device 30, the personal computer makes an image judgment to inspect a held posture of the optical fiber cord 102 (i.e. the optical fibers 102a of the optical fiber cord 102) in the optical connector 100. The four transmitted light beams obtained by the transmission of the inspection light through the reference hole portions 101c serve as reference positions in the screen coordinate system. Since this type of image judgment is known, a detailed description thereof is omitted.

While confirming the inspection result of the held posture of the optical fiber cord 102 (i.e. the optical fibers 102a of the optical fiber cord 102) in the optical connector 100, an optical connector assembler adjusts the posture of the optical fibers 102a to a correct posture and, in this state, fixes the optical fibers 102a to the optical fiber holding portion 101b by the use of, for example, an ultraviolet-setting adhesive.

In this optical connector inspection apparatus, particularly, the light source 20 is disposed in a direction traversing the axial direction A of the optical connection 100. The light source 20 is disposed in a direction vertical to the axial direction A (upward in the figure) in this embodiment, but may be disposed at an angle other than vertical. In order to allow the inspection light from the light source 20 to enter the four reference hold portions 101c of the optical connector 100, the optical connector holder 10 has inspection light reflecting portions 13 serving to reflect the inspection light and deflect it thereby into the axial direction A of the optical connector 100. For example, the inspection light reflecting portions 13 is formed in mirror finish and angled in 45 degrees.

Now, the optical connector inspection method using this optical connector inspection apparatus will be described with reference to FIGS. 3 to 5.

First, the optical connector 100 is held by the optical connector holder 10.

Then, inspection light is emitted from the light source 20. The inspection light from the light source 20 is reflected and deflected thereby into the axial direction A by the inspection light reflecting portions 13 of the optical connector holder 10 and enters the four reference hole portions 101c from the rear end of the optical connector 100.

The image pickup device 30 picks up images of transmitted light beams obtained by transmission of the inspection light through the four reference hole portions 101c and an image of the end face of the optical fiber cord 102 (i.e. the optical fibers 102a of the optical fiber cord 102) held by the optical fiber holding portion 101b. The non-illustrated calculation means connected to the image pickup device 30 performs predetermined image processing to inspect a held posture of the optical fiber cord 102 (i.e. the optical fibers 102a of the optical fiber cord 102).

While confirming the inspection result of the held posture of the optical fiber cord 102 (i.e. the optical fibers 102a of the optical fiber cord 102) in the optical connector 100, an optical connector assembler adjusts the posture of the optical fibers 102a to a correct posture and, in this state, fixes the optical fibers 102a to the optical fiber holding portion 101b by the use of, for example, an ultraviolet-setting adhesive.

Second Embodiment

The optical connector inspection apparatus according to the second embodiment of this invention differs from the first embodiment in having a second image pickup device. Accordingly, the same reference symbols are assigned to the same or similar portions as those in the first embodiment and a detailed description thereof is omitted.

Figure 6:
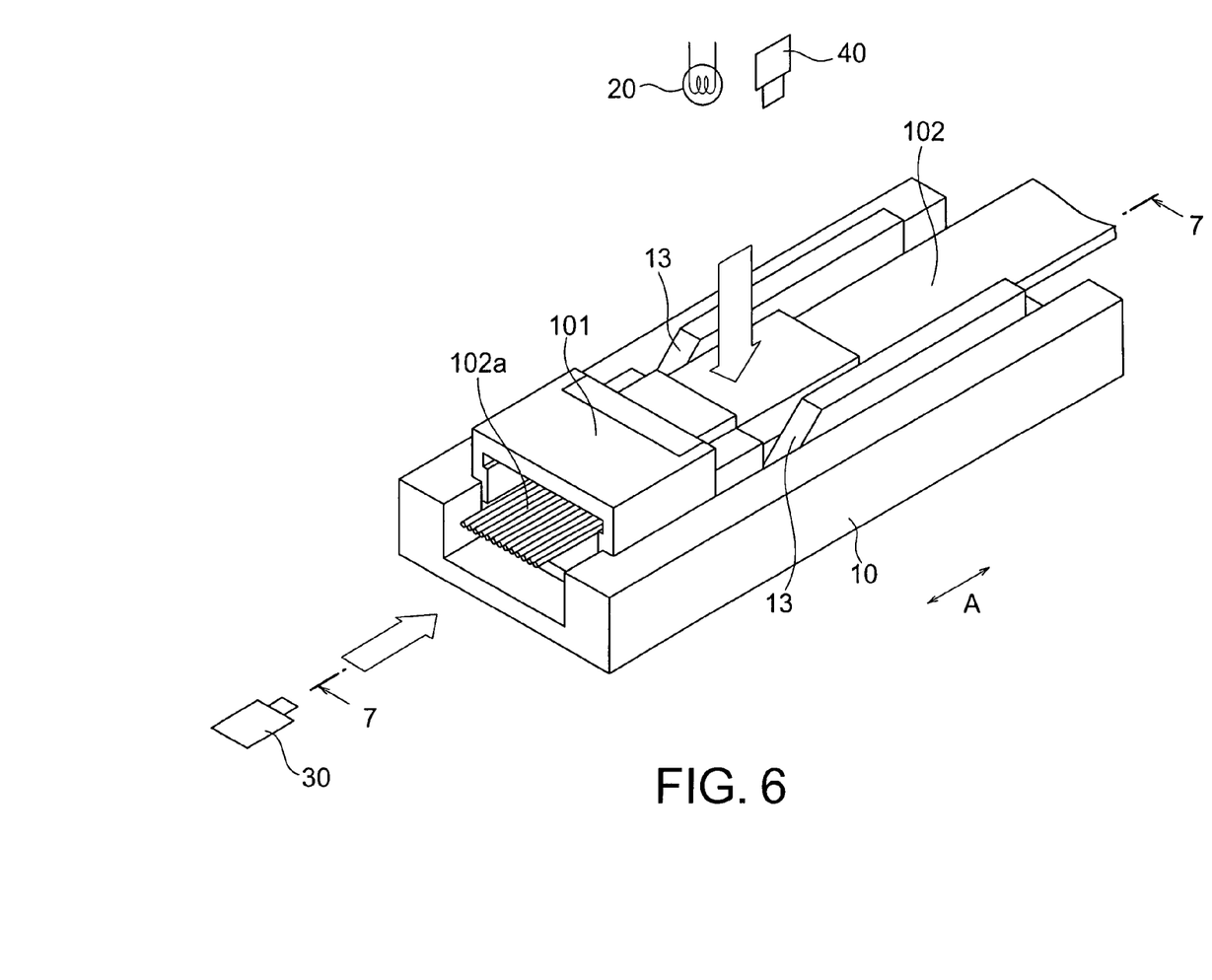
FIG. 6 is a perspective view showing the optical connector inspection apparatus holding the optical connector according to the second embodiment of this invention.
Figure 7:
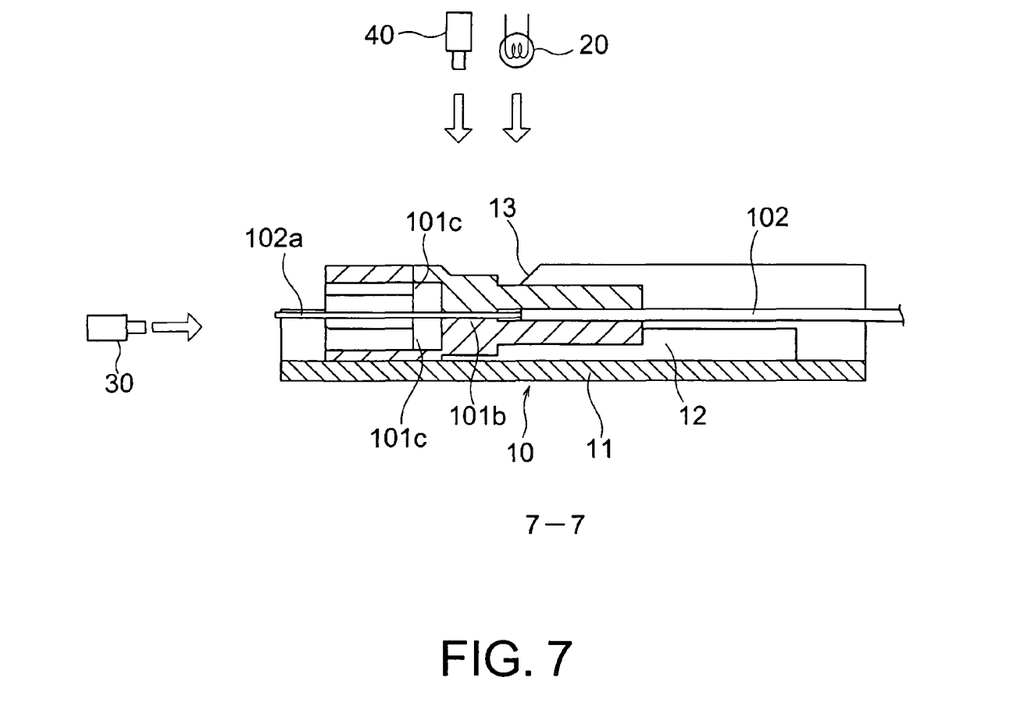
FIG. 7 is a sectional view, taken along section line 7-7, of the optical connector inspection apparatus shown in FIG. 6.

Referring to FIGS. 6 and 7, this optical connector inspection apparatus inspects a held posture of the optical fiber cord 102 (i.e. the optical fibers 102a of the optical fiber cord 102) in the optical connector 100 and comprises an optical connector holder 10, a light source 20, and an image pickup device 30.

The image pickup device 30 is disposed forward of the optical connector 100 and adapted to pick up images of transmitted light beams obtained such that inspection light irradiated to the rear end of the optical connector 100 held by the optical connector holder 10 is transmitted through the four reference hole portions 101c, and an image of an end face of the optical fiber cord 102 held by the optical fiber holding portion 101b. The image pickup device 30 is formed by, for example, a CCD camera. The image pickup device 30 is connected to, for example, a non-illustrated calculation portion formed by a personal computer and dedicated software.

The light source 20 is disposed in a direction traversing the axial direction A of the optical connector 100. The light source 20 is disposed in a direction vertical to the axial direction A (upward in the figure) in this embodiment, but may be disposed at an angle other than vertical.

In order to allow the inspection light from the light source 20 to enter the four reference hole portions 101c of the optical connector 100, the optical connector holder 10 has inspection light reflecting portions 13 serving to deflect and reflect the inspection light in the axial direction A of the optical connector 100.

Particularly, this optical connector inspection apparatus further comprises a second image pickup device 40 disposed in a direction orthogonal to the axial direction A of the optical connector 100 held by the optical connector holder 10, and adapted to pick up an image of a side surface (upper surface) of the optical fiber cord 102 (i.e. the optical fibers 102a of the optical fiber cord 102) protruding from the front end of the optical connector 100 held by the optical connector holder 10. The second image pickup device 40 is also formed by, for example, a CCD camera. Like the image pickup device 30, the second image pickup device 40 is connected to the non-illustrated calculation portion.

The second image pickup device 40 may be disposed near the light source 20 or may be integrally formed with the light source 20.

Based on the image pickup result by the second image pickup device 40 in addition to the image pickup result by the image pickup device 30 as factors of a held posture of the optical fibers in the optical connector 100, the calculation portion makes an image judgment to inspect a held posture of the optical fiber cord 102 (i.e. the optical fibers 102a of the optical fiber cord 102) in the optical connector 100. From the image pickup result by the second image pickup device 40, it is possible to inspect a protruding amount of the optical fiber cord 102 (i.e. the optical fibers 102a of the optical fiber cord 102) from the front end of the optical connector 100.

While confirming the inspection result of the held posture of the optical fiber cord 102 (i.e. the optical fibers 102a of the optical fiber cord 102) in the optical connector 100, an optical connector assembler adjusts the posture of the optical fibers 102a to a correct posture and, in this state, fixes the optical fibers 102a to the optical fiber holding portion 101b by the use of, for example, an ultraviolet-setting adhesive.

Now, the optical connector inspection method using this optical connector inspection apparatus will be described with reference to FIGS. 6 and 7.

First, the optical connector 100 is held by the optical connector holder 10.

Then, inspection light is emitted from the light source 20. The inspection light from the light source 20 is deflected and reflected in the axial direction A by the inspection light reflecting portions 13 of the optical connector holder 10 and enters the four reference hole portions 101c from the rear end of the optical connector 100.

The image pickup device 30 picks up images of transmitted light beams obtained by transmission of the inspection light through the four reference hole portions 101c and an image of the end face of the optical fiber cord 102 (i.e. the optical fibers 102a of the optical fiber cord 102) held by the optical fiber holding portion 101b.

The second image pickup device 40 picks up an image of the side surface of the optical fiber cord 102 (i.e. the optical fibers 102a of the optical fiber cord 102) protruding from the front end of the optical connector 100 held by the optical connector holder 10.

The non-illustrated calculation portion connected to the image pickup device 30 and the second image pickup device 40 performs predetermined image processing to inspect a held posture of the optical fiber cord 102 (i.e. the optical fibers 102a of the optical fiber cord 102) including a protruding amount of the optical fiber cord 102 (i.e. the optical fibers 102a of the optical fiber cord 102) from the front end of the optical connector 100.

While confirming the inspection result of the held posture of the optical fiber cord 102 (i.e. the optical fibers 102a of the optical fiber cord 102) in the optical connector 100, an optical connector assembler adjusts the posture of the optical fibers 102a to a correct posture and, in this state, fixes the optical fibers 102a to the optical fiber holding portion 101b by the use of, for example, an ultraviolet-setting adhesive.

It is needless to say that this invention is not limited to the above-mentioned embodiments and that various changes can be made within the technical scope described in the claims.

What is claimed is:

1. A combination of an optical connector inspection apparatus and an optical connector inspecting in cooperation with each other a held posture of an optical fiber in the optical connector, the optical connector having a fitting hole portion formed at a front end in an axial direction thereof to be fitted with a mating connector in the axial direction, an optical fiber holding portion penetrating in the axial direction and holding the optical fiber so that the optical fiber extends in the axial direction, and a rear end portion from which the optical fiber leads out in the axial direction; wherein the optical connector further has four reference hole portions formed at corners of an inside of the fitting hole portion, each reference hole portion penetrating in the axial direction and opening at the rear end portion; wherein the optical connector inspection apparatus comprises:

an optical connector holder holding the optical connector with the optical fiber held by the optical fiber holding portion;

a light source disposed rearward of the optical connector held on the optical connector holder, emitting inspection light in a direction traversing the axial direction of the optical connector;

an inspection light reflecting portion, formed on the optical connector holder, serving to reflect the inspection light emitted from the light source and deflect the inspection light thereby into the axial direction so that the inspection light enters the four reference hole portions from the rear end portion of the optical connector; and an image pickup device disposed forward of the optical connector held on the optical connector holder, the image pickup device picking up images of transmitted light beams obtained by transmission of the inspection light through the four reference hole portions and an image of a front end face of the optical fiber held by the optical fiber holding portion;

wherein the optical connector inspection apparatus inspects the held posture of the optical fiber held by the optical fiber holding portion of the optical connector based on an image pickup result by the image pickup device.

2. The combination of the optical connector inspection apparatus and the optical connector according to claim 1, the optical connector inspection apparatus further comprising a second image pickup device disposed in a direction orthogonal to the axial direction of the optical connector held by the optical connector holder, picking up an image of a frontward edge of the optical connector held on the optical connector holder and a side surface of the optical fiber held by the optical fiber holding portion and protruding from the front end portion of the optical connector;

wherein the apparatus further inspects a protruding amount of the optical fiber from the front end portion of the optical connector based on an image pickup result by the second image pickup device as the held posture of the optical fiber in the optical connector.

3. An optical connector inspection method of inspecting a held posture of an optical fiber in an optical connector with the use of the optical connector, the optical connector having a fitting hole portion formed at a front end in an axial direction thereof to be fitted with a mating connector in the axial direction, an optical fiber holding portion penetrating in the axial direction and holding the optical fiber so that the optical fiber extends in the axial direction, a rear end portion from which the optical fiber leads out in the axial direction and four reference hole portions formed at corners of an inside of the fitting hole portion, each reference hole portion penetrating in the axial direction and opening at the rear end portion, said method comprising the steps of:

holding the optical connector with the optical fiber held by the optical fiber holding portion;

emitting inspection light from a source position located rearward of the optical connector, the inspection light being emitted in a direction traversing the axial direction of the optical connector;

reflecting and thereby deflecting the inspection light into the axial direction so that the inspection light enters the four reference hole portions from the rear end portion of the optical connector; and picking up images of transmitted light beams obtained by transmission of the inspection light through the four reference hole portions and an image of a front end face of the optical fiber held by the optical fiber holding portion at a pickup position disposed forward of the optical connector;

wherein the method inspects the held posture of the optical fiber held by the optical fiber holding portion of the optical connector based on an image pickup result from the image pickup step.

4. The optical connector inspection method according to claim 3, further comprising a step of secondary picking up an image of a side surface of the optical fiber protruding from the front end portion of the optical connector held in the optical connector holding step;

wherein, in the second image pickup step, picking up an image of a frontward edge of the optical connector held in the optical connector holding step and a side surface of the optical fiber held by the optical fiber holding portion and protruding from the front end portion of the optical connector;

wherein the method further inspects a protruding amount of the optical fiber from the front end portion of the optical connector based on an image pickup result in the second image pickup step as the held posture of the optical fiber in the optical connector.

* * * * *